(No Model.)
S. SCHUCH.
SHAFT BEARING IN WHEELS.
No. 296,465. Patented Apr. 8, 1884.
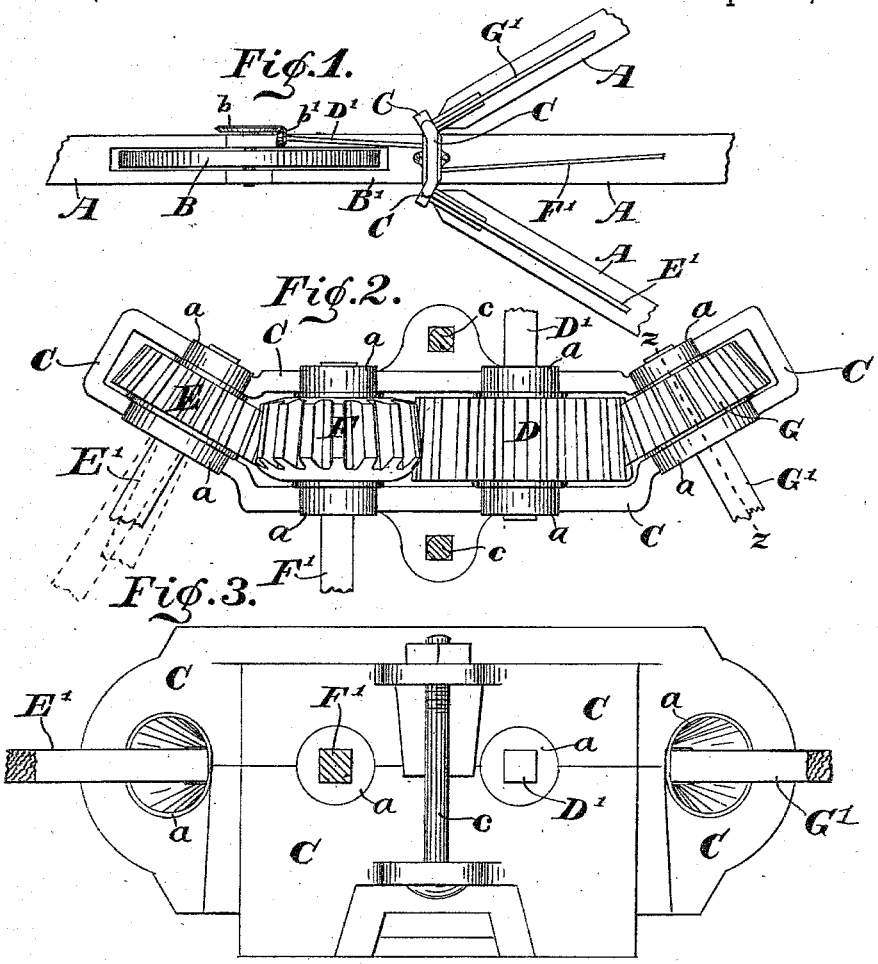
WITNESSES.
Chas N. Leonard.
E. W. Bradford,
INVENTOR.
Samuel Schuch,
PER
C. Bradford,
ATTORNEY.
N. PETERS. Photo-Lithographer, Washington, D. C.

UNITED STATES PATENT OFFICE.

SAMUEL SCHUCH, OF INDIANAPOLIS, INDIANA, ASSIGNOR TO EWALD OVER, OF SAME PLACE.

SHAFT-BEARING IN WHEELS.

SPECIFICATION forming part of Letters Patent No. 296,465, dated April 8, 1884.

Application filed February 12, 1884. (No model.)

*To all whom it may concern:*

Be it known that I, SAMUEL SCHUCH, of the city of Indianapolis, county of Marion, and State of Indiana, have invented certain new and useful Improvements in Shaft-Bearings in Wheels, of which the following is a specification.

The object of my said invention is to permit the shafts of wheels to be varied in position without varying the position of the wheels themselves, whereby said shafts may be driven by or drive said wheels while in various relations thereto. The class of wheels to which my invention is most applicable is that in which the wheels are provided with extended hubs, forming journal-bearings, which rest in boxes and support the wheel independently of the shaft. Said object is accomplished by making the orifice through the wheel through which the shaft extends conical for the greater portion of its length, leaving only a narrow shaft-bearing, and making the shaft-bearing slightly loose, thus permitting the shaft to vary as desired, as will be presently more fully described.

My said invention is of especial value in gearing for grain-drills, and is shown as embodied in such gearing.

Referring to the accompanying drawings, which are made a part hereof, and on which similar letters of reference indicate similar parts, Figure 1 is a top or plan view of so much of the frame-work and mechanism of a grain-drill as illustrates the location and operation of a gearing embodying my invention; Fig. 2, a top or plan view of such a gearing on an enlarged scale, the cap-piece of the casing being removed; Fig. 3, a side elevation of the box in which said gearing is mounted, showing my invention embodied in the outer wheels thereof; Fig. 4, a central vertical section through one of said wheels, the box, and shaft, on the dotted line $z\ z$; and Fig. 5, a similar view, showing a different construction of the bearing.

In said drawings, the portions marked A represent the frame-work of the grain-drill; B, the usual carrying and driving wheel; C, the gear-box; D, the main or driving wheel in said box; D', the shaft which drives said wheel; E, F, and G, other wheels for driving the shafts which drive the feeding mechanism in the feed-boxes of the drill, and E' F' G' said shafts.

The frame and other several parts of the grain-drill, which is shown with my invention applied thereto, are not of peculiar construction, and, as they form no part of this invention, need no special description.

The gear-box C is of the suitable size and shape to answer its purpose. Its wings are preferably bent forward, as shown, in order to bring the wheels mounted therein into a substantially right-angular relation with the shafts which they drive. It consists, preferably, of two halves secured together by bolts $c$, and the whole device is secured on the frame-work A, as shown. Openings are formed in the front and rear sides of the box, which form the boxings in which the gear-wheels D E F G are journaled. The driving-wheel D is provided with journal-bearings $a$, which rest in boxings in the sides of the box, as before described. It is driven through the shaft D' from the wheel B, a gear-wheel, $b$, on the shaft of the wheel B engaging with a gear-wheel, $b'$, on the end of the shaft B', in the usual manner. The wheels E F G are also provided with journal-bearings $a$, which rest in the boxings in the sides of the box, in the same manner as do those of the wheel D. Said wheels all mesh together, as shown, two being placed on one side of the driving-wheel and one on the other. The bearings provided for the shafts E' and G' in the wheels E and G in the wings of the box are square but a short portion of the length of the hub, and the remaining portion is made conical or flaring. In Fig. 4 the square portion is shown as being formed in one end and flared therefrom to the other end. Fig. 5 shows the square part of the bearing formed in the middle and flared at both ends. By the use of either of these constructions the object of my invention is equally as well accomplished, as in either case the side bars of the frame-work of the machine bearing the feed-boxes, together with the shafts E' and G', can be varied from side to side without interfering with the operation of the machine. The bearings for the shafts are made a trifle loose, thus permitting said shafts to vary their positions in said bearings, as before described, and as indicated by the dotted lines in Fig. 2.

Having thus fully described my said invention, what I claim as new, and desire to secure by Letters Patent, is—

1. A gear-wheel provided with external journal-bearings, $a$, and an internal shaft-bearing, the latter of which extends only a portion of its length, the remaining portion being formed flaring, substantially as described, and for the purposes specified.

2. The combination of a gear-wheel having external journal-bearings, $a$, independent boxings therefor, a loose non-circular internal shaft-bearing, and a correspondingly-formed shaft, substantially as set forth.

3. The combination of a casing or frame-work having boxings for the wheels, wheels mounted in said boxings and provided with internal shaft-bearings, said shaft-bearings being adapted to engage with the shafts but a portion of their length, the remaining portion being formed flaring, whereby the line of the shaft may be varied without changing the position of the wheels, substantially as set forth.

4. In a grain-drill, the combination, with the frame-work, of the gear-box C, gear-wheels D E F G, mounted therein, the wheels E and G being provided with conical bearings, and the shafts E' F' G', mounted in and driven by said wheels E F G, and means for operating the same, substantially as described, and for the purposes specified.

In witness whereof I have hereunto set my hand and seal, at Indianapolis, Indiana, this 8th day of February, A. D. 1884.

SAMUEL SCHUCH. [L. S.]

In presence of—
C. BRADFORD,
CHAS. L. THURBER.